(12) United States Patent
Bombini et al.

(10) Patent No.: US 10,845,590 B2
(45) Date of Patent: Nov. 24, 2020

(54) METHOD AND/OR APPARATUS FOR CLEANING A CAMERA LENS

(71) Applicant: Ambarella International LP, Santa Clara, CA (US)

(72) Inventors: Luca Bombini, Felegara (IT); Gabriele Camellini, Reggio nell'Emilia (IT); Paolo Zani, Noceto (IT)

(73) Assignee: Ambarella International LP, Santa Clara, CA (US)

( * ) Notice: Subject to any disclaimer, the term of this patent is extended or adjusted under 35 U.S.C. 154(b) by 296 days.

(21) Appl. No.: 16/116,186

(22) Filed: Aug. 29, 2018

(65) Prior Publication Data

US 2019/0302449 A1 Oct. 3, 2019

(30) Foreign Application Priority Data

Mar. 28, 2018 (IT) .................... 10201804056

(51) Int. Cl.
| | |
|---|---|
| G02B 27/00 | (2006.01) |
| B08B 5/02 | (2006.01) |
| B08B 5/04 | (2006.01) |
| B60S 1/54 | (2006.01) |
| B60S 1/60 | (2006.01) |

(52) U.S. Cl.
CPC ............ *G02B 27/0006* (2013.01); *B08B 5/02* (2013.01); *B08B 5/04* (2013.01); *B60S 1/54* (2013.01); *B60S 1/60* (2013.01)

(58) Field of Classification Search
CPC ......... G02B 27/0006; B08B 5/04; B08B 5/02; B60S 1/54; B60S 1/60; B60S 1/56; B60R 2011/004; B60R 11/04; G03F 7/70925

USPC .......................................................... 359/509
See application file for complete search history.

(56) References Cited

U.S. PATENT DOCUMENTS

| | | | |
|---|---|---|---|
| 2015/0353024 A1* | 12/2015 | Cooper ................. | B60S 1/0848 348/148 |
| 2017/0036647 A1 | 2/2017 | Zhao et al. | |
| 2017/0297536 A1 | 10/2017 | Giraud et al. | |
| 2018/0178259 A1* | 6/2018 | Gillies ................. | H04N 5/2252 |

FOREIGN PATENT DOCUMENTS

| | | | | |
|---|---|---|---|---|
| CN | 106740708 A | 5/2017 | ............... | B60S 1/54 |
| DE | 10225151 A1 | 6/2002 | ............ | G01N 21/15 |
| EP | 2468579 A2 | 12/2011 | ............... | B60S 1/56 |
| JP | 2012201122 A | 10/2012 | ............... | B60S 1/66 |

* cited by examiner

*Primary Examiner* — William R Alexander
*Assistant Examiner* — Henry A Duong
(74) *Attorney, Agent, or Firm* — Christopher P. Maiorana, PC

(57) ABSTRACT

An apparatus includes a fan and a chamber. The fan may be configured to generate an airflow. The chamber may include a tunnel with a first opening and a second opening and be configured to move the airflow through the tunnel and across a camera lens. The first opening may be located close enough to clean the camera lens by directing the airflow across the camera lens. The first opening may be on an edge of the chamber that extends the tunnel in a direction of an optical axis of the camera lens. The edge has an angle that corresponds to a field of view of the camera lens such that the field of view is not obstructed.

19 Claims, 14 Drawing Sheets

METHOD AND/OR APPARATUS FOR CLEANING A CAMERA LENS

This application relates to Italian Application No. 102018000004056, filed Mar. 28, 2018, which is hereby incorporated by reference in its entirety.

FIELD OF THE INVENTION

The invention relates to cameras generally and, more particularly, to a method and/or apparatus for cleaning a camera lens.

BACKGROUND

Conventional cameras operating in an outdoor environment, such as an automotive environment, tend to accumulate contaminants over the camera lens. Such contaminants negatively affect the quality of the captured images (i.e., obscure, obstruct, blur, etc.). A driver cannot manually clean the lenses while driving. Consumers expect a maintenance free operation of cameras in such an environment.

It would be desirable to implement a method and/or apparatus for cleaning a camera lens.

SUMMARY

The invention encompasses an aspect concerning an apparatus including a fan and a chamber. The fan may be configured to generate an airflow. The chamber may include a tunnel with a first opening and a second opening and be configured to move the airflow through the tunnel and across a camera lens. The first opening may be located close enough to clean the camera lens by directing the airflow across the camera lens. The first opening may be on an edge of the chamber that extends the tunnel in a direction of an optical axis of the camera lens. The edge has an angle that corresponds to a field of view of the camera lens such that the field of view is not obstructed.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a method and/or apparatus for cleaning a camera lens that may (i) provide airflow over the lens, (ii) modulate the airflow in response to environmental conditions, (iii) be implemented in the bumper guard of a vehicle, (iv) pull air from a protected area and/or (v) be implemented without obstructing a view of a camera sensor.

Figure 1:
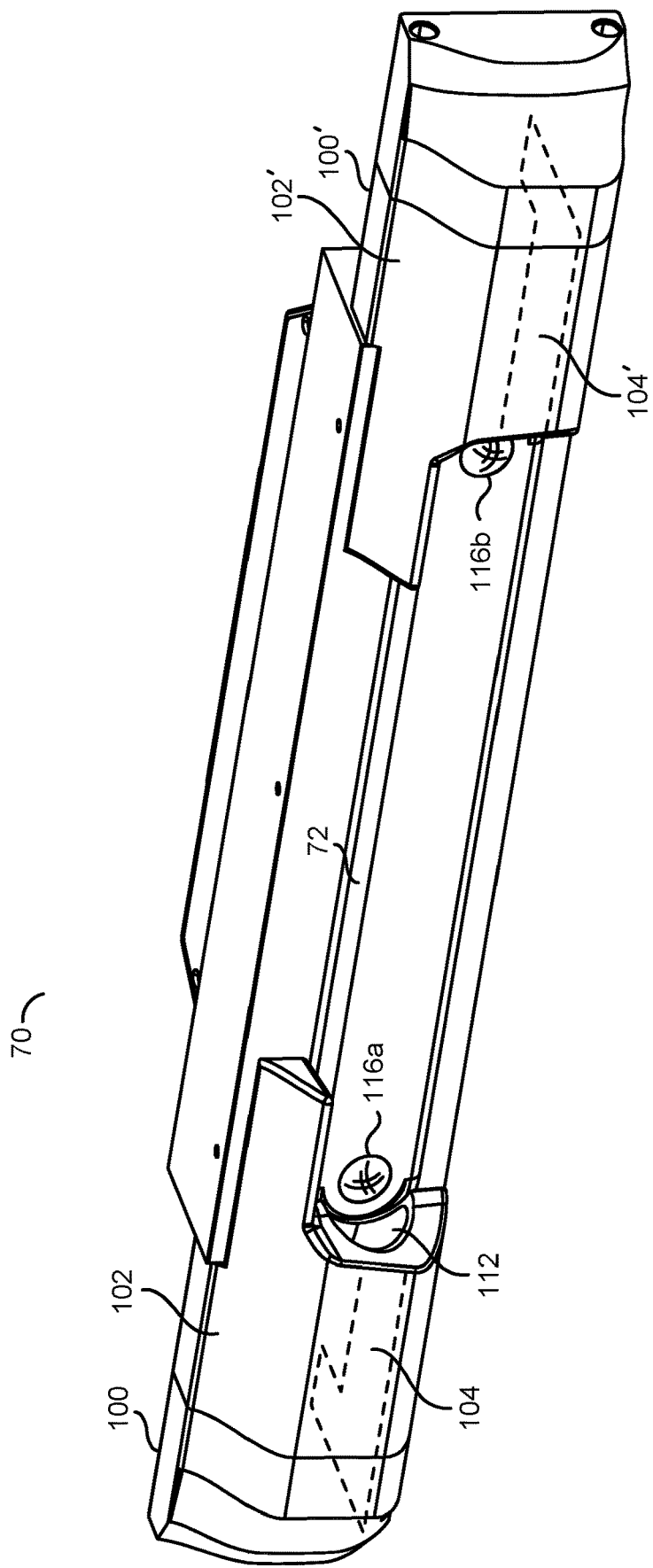
FIG. 1 is a diagram of an embodiment of the invention.

Referring to FIG. 1, a diagram of an apparatus 100 is shown in accordance with an embodiment of the invention. The apparatus 100 may be implemented as part of a camera mount rig 70. In the example shown, a camera body 72 may implement two cameras (e.g., with associated circuitry within the camera body 72) each having a respective camera lens 116a-116b. In some embodiments, the camera mount rig 70 may comprise one apparatus 100 on one end and a second apparatus 100' on an opposite end. Generally, the apparatus 100 and the apparatus 100' may have similar implementations. For clarity, the apparatus 100 may be described and the details of the apparatus 100 may be applicable to the apparatus 100'.

The apparatus 100 is shown mounted on one end of the camera body 72. The apparatus 100 generally comprises a chamber 102 and tunnel 104. The tunnel 104 may pass through an interior of the chamber 102. The tunnel 104 may end at an opening 112 of the chamber 102. The opening 112 may be located near a first lens 116a. In one example, the opening 112 may be implemented as a blower outlet. In another example, the opening 112 may be implemented as a blower intake. The opening 112 may allow air to move through the tunnel 104 formed in the chamber 102. A fan (not shown) may be located on an opposite end of the chamber 102 (e.g., within the tunnel 104). The fan may be implemented to provide an airflow through the tunnel 104 and across the lens 116a.

Figure 2:
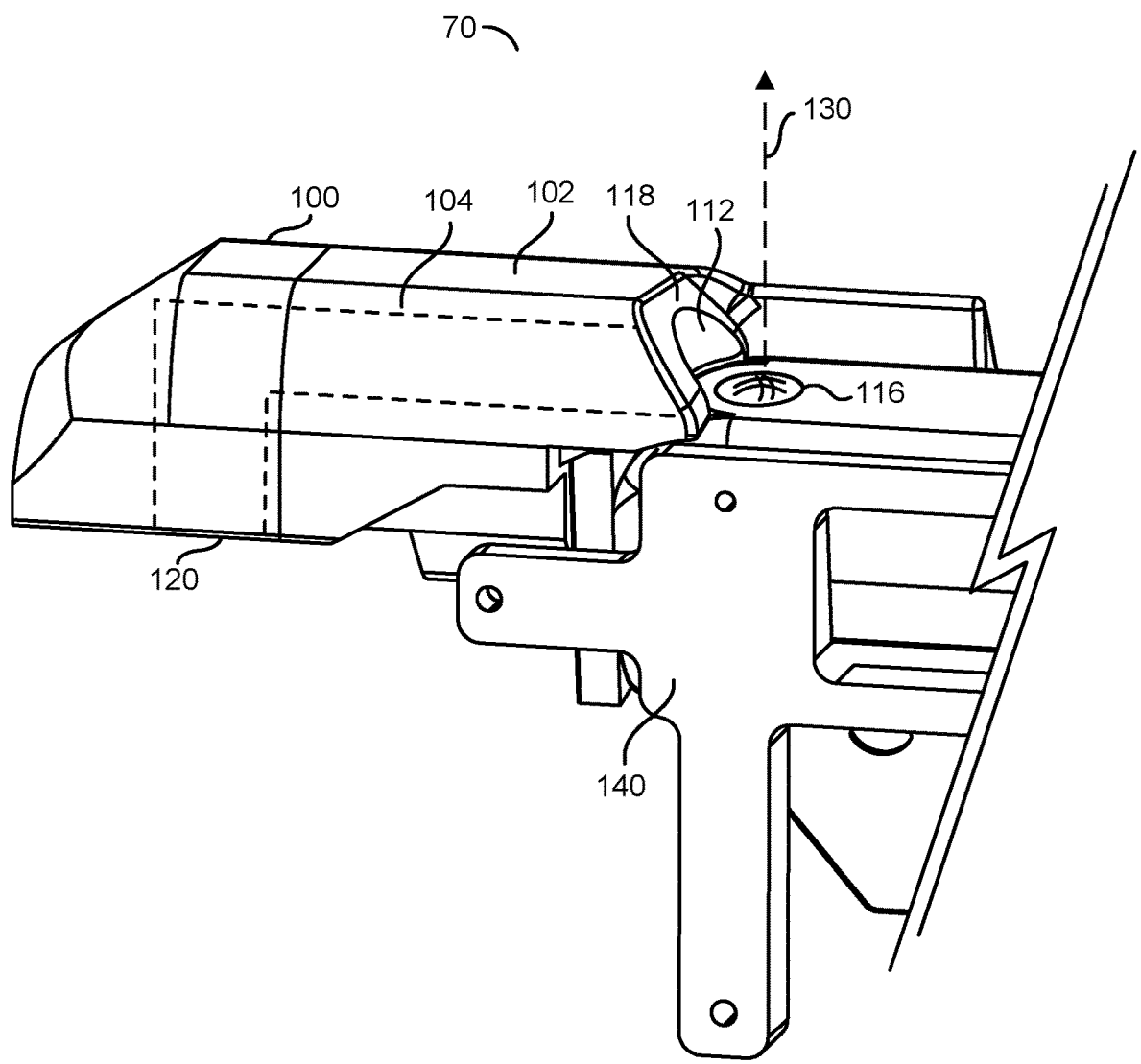
FIG. 2 is a perspective view of an exhaust portion of a chamber.

Referring to FIG. 2, a more detailed diagram of the apparatus 100 and the mounting rig 70 is shown. The mounting rig 70 is shown rotated 90 degrees compared with the view shown in FIG. 1. In the example shown, the tunnel 104 is shown having a bend (e.g., a 90 degree bend). In some embodiments, the tunnel 104 may be curved. In some embodiments, the tunnel 104 may not be bent or curved (e.g., a straight path). An opening 120 is shown at an end of the tunnel 104. For example, the tunnel 104 may extend from the second opening 120 to the first opening 112 of the chamber 102.

The lens 116 is shown in a generally upward direction. An optical axis 130 of the camera lens 116 is shown. The chamber 102 has an angled edge (e.g., face) 118. The face 118 generally has an angle sufficient to allow the lens 116 to have a clear view. For example, the face 118 may be angled corresponding to a field of view of the lens 116. If the view through the lens 116 is slightly obstructed by the chamber 102, the electronics of the camera may be implemented to mask off the obstructed portion. Such an obstruction may occur in an extremely fish eyed implementation on the lens 116. The apparatus 100 may be mounted to a bracket 140. In an example, the bracket 140 may enable the camera mount rig 70 to be mounted to a vehicle.

Figure 3:
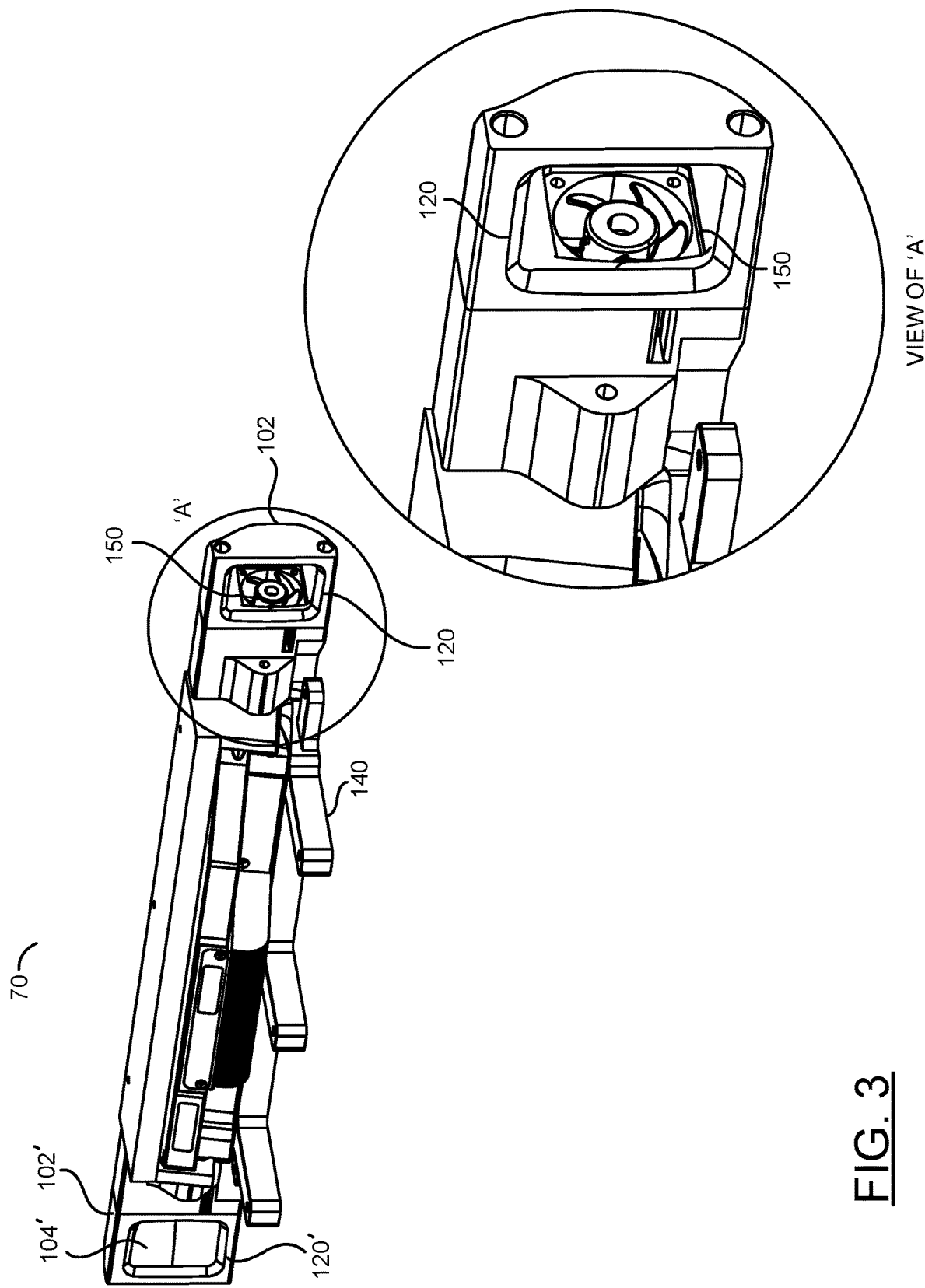
FIG. 3 is a more detailed diagram of a fan assembly.

Referring to FIG. 3, a more detailed diagram of a portion of the chamber 102 is shown. The chamber 102 in FIG. 3 is shown generally rotated 90 degrees with respect to FIG. 2, and 180 degrees with respect to FIG. 1. A fan 150 is shown within the tunnel 104 of the chamber 102. The fan 150 provides a source (e.g., an active force) of airflow. The airflow may be a steady flow of air that moves across the lens 116. In general, one fan 150 may be implemented per lens 116a-116b. However, two or more of the fans may be implemented to provide additional airflow.

The fan 150 is shown visible through the second opening 120. In one example, the fan 150 may push the airflow through the second opening 120 (e.g., the second opening may be an exhaust). In another example, the fan 150 may pull the airflow through the second opening 120 (e.g., the second opening may be an intake). The fan 150 may push/pull the airflow through the tunnel 104. In some embodiments, the opening 120 may be coupled with a protected area. Coupling the opening 120 to the protected area may ensure that the airflow is clean.

Figure 4:
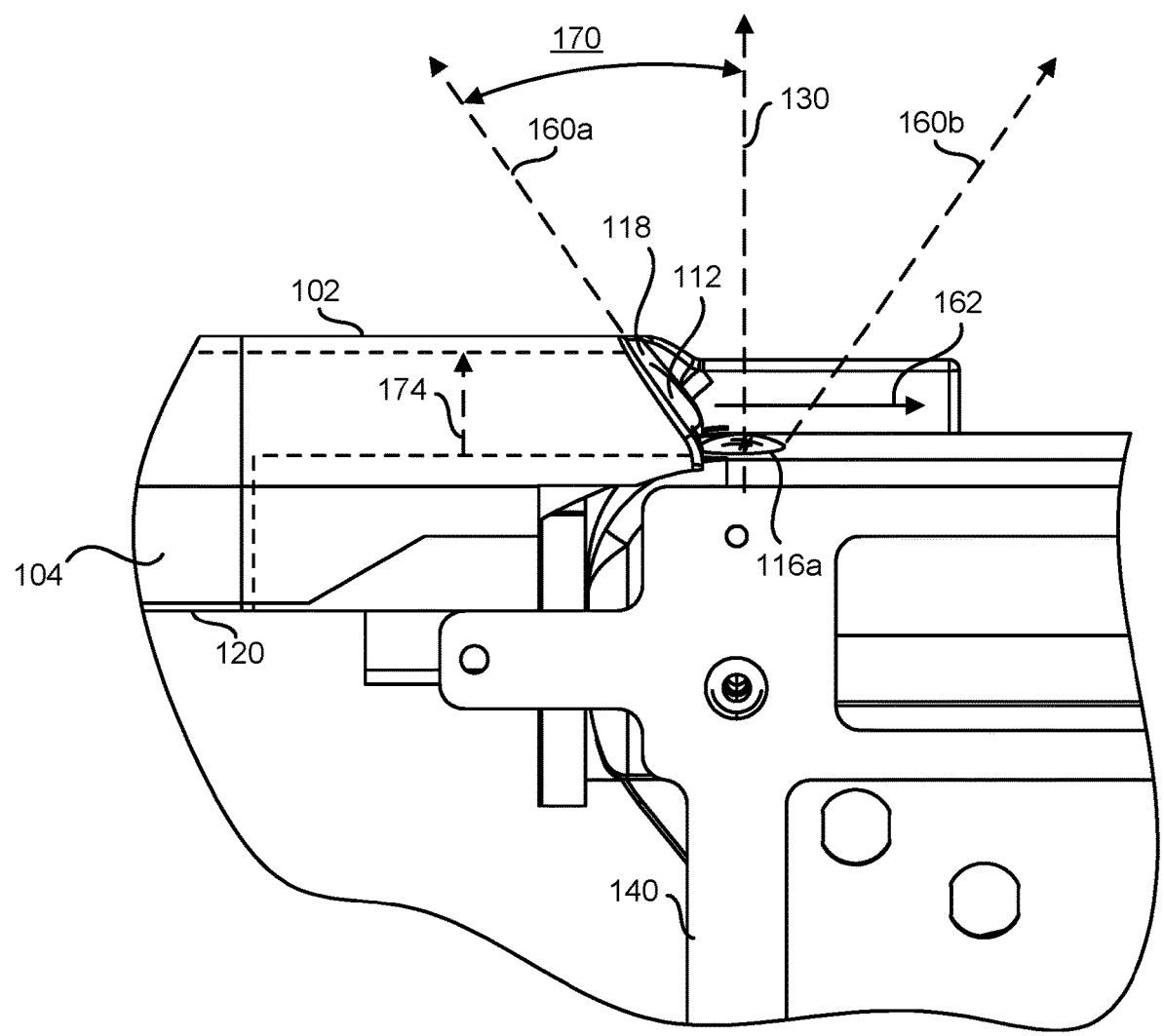
FIG. 4 is a side view of the exhaust portion in relation to a lens.

Referring to FIG. 4, a side view of the blower outlet 112 is shown. The lens 116a is shown with an arrow 160a and an arrow 160b generally defining and/or representing a field of view of the camera lens 116a. The optical axis 130 is shown extending from the camera lens 116a. The outlet opening 112 and/or the edge 118 is shown having an angle generally matching the arrow 160a (e.g., matching an angle of the field of view 160a-160b). The edge 118 may be angled to prevent blocking the field of view 160a-160b of the camera lens 116a.

An arrow 162 is shown extending from the opening 112. The arrow 162 may represent an airflow through the tunnel 104. The outlet 112 may be located close enough to the lens 116a to direct the airflow 162 to clean the lens 116a. The outlet 112 may direct the airflow 162 across the lens 116a in a general direction shown by the arrow 162. The outlet 112 may be located on the edge 118 of the chamber 102.

The arrows 160a and 160b are shown unobstructed by the chamber 102. The field of view of the camera lens 116a represented by the arrow 160a and the arrow 160b extend from the edges of an optical range of the lens 116a. The edge 118 of the chamber 102 may have an angle that corresponds to the field of view 160a-160b of the lens 116a such that the field of view of the lens 116a is not obstructed. In some embodiments, the angle of the edge 118 may be greater than the angle of the field of view represented by the arrow 160a. The shape of the edge 118 may be designed to balance directing sufficient airflow 162 across the lens 116a and providing an unobstructed field of view 160a-160b for the lens 116a.

An angle 170 is shown between the arrow 160a and the optical axis 130. The angle 170 may represent the angle of the edge 118 with respect to the optical axis 130 of the camera lens 116a. The opening 112 and/or the edge 118 may have an angle of less than 90 degrees with respect to the optical axis 130. In some embodiments, the angle of the edge 118 may correspond with the angle 170.

The tunnel 104 is shown within the chamber 102. An arrow 174 is shown. The arrow 174 may show a direction that the tunnel 104 extends with respect to a face of the camera body 72. The tunnel 104 may extend from the camera body 72 to an end of the chamber 102 (e.g., the size of the opening 112). A vertical height of the edge 118 may extend the tunnel 104 in the direction of the optical axis 130. For example, the chamber 102 may be offset from a face of the camera body 72. The edge 118 may extend the tunnel 104 and/or the chamber 102 beyond the lens 116a.

Figure 5:
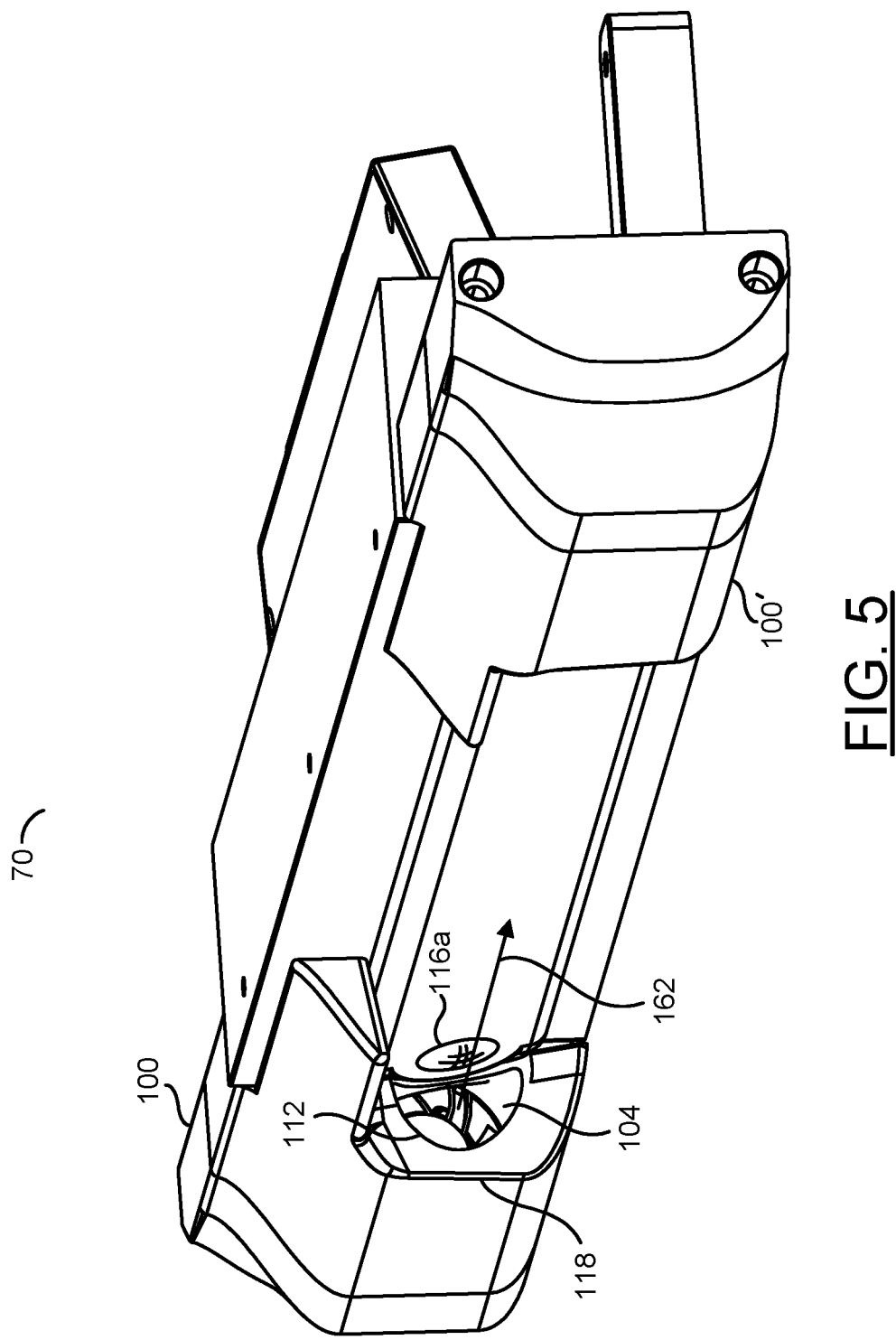
FIG. 5 is a perspective view of the fan positioned in the chamber.

Referring to FIG. 5, another diagram of the opening 112 is shown. A portion of the interior of the tunnel 104 is shown. The fan 150 may be within the tunnel 104. The arrow 162 shows the general direction of airflow across the lens 116a. The particular speed of the airflow may be varied to meet the design criteria of a particular implementation.

A variety of speeds may be used to provide sufficient airflow to keep dust and/or debris from accumulating on the lens 116a. The speed of the airflow is generally determined by the airflow capacity of the fan 150. Airflow in the range of around 20 m/s may be used. In some implementations the air speed may be modulated (e.g., increased or decreased).

Figure 6:
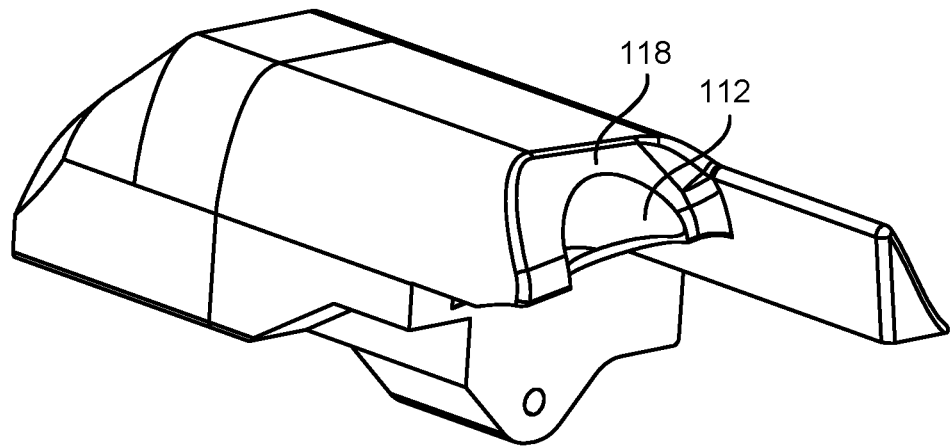
FIG. 6 is a perspective view of a blower outlet of the chamber.

Referring to FIG. 6, a diagram of the blower outlet 112 removed from the mounting portion 72 is shown. In an example, the blower outlet 112 may be implemented as a separate piece that may be secured to the camera mount rig 70 and/or the camera body 72. In another example (to be described in connection with FIGS. 10 and 11), the blower outlet 112 may be integrated into a housing of a camera assembly. The opening 112 is shown having a shape corresponding to a contour of the edge 118.

Figure 7:
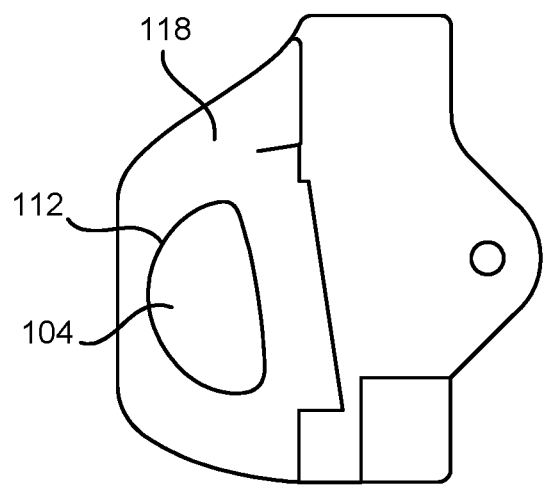
FIG. 7 is a side view of the blower outlet.

Referring to FIG. 7, a cross-section of the blower outlet 112 is shown. The shape of the edge 118 is shown. The shape of the blower outlet 112 is shown having a generally oval like shape. The shape of the tunnel 104 may be similar to the shape of the opening 112. The particular shape of the blower outlet 112 and/or the tunnel 104 may be tuned (or varied) to allow a targeted airflow for a particular installation. The particular shape of the blower outlet 112 and/or the tunnel 104 may be tuned (or varied) based on the field of view of the lenses 116a-116b.

Figure 8:
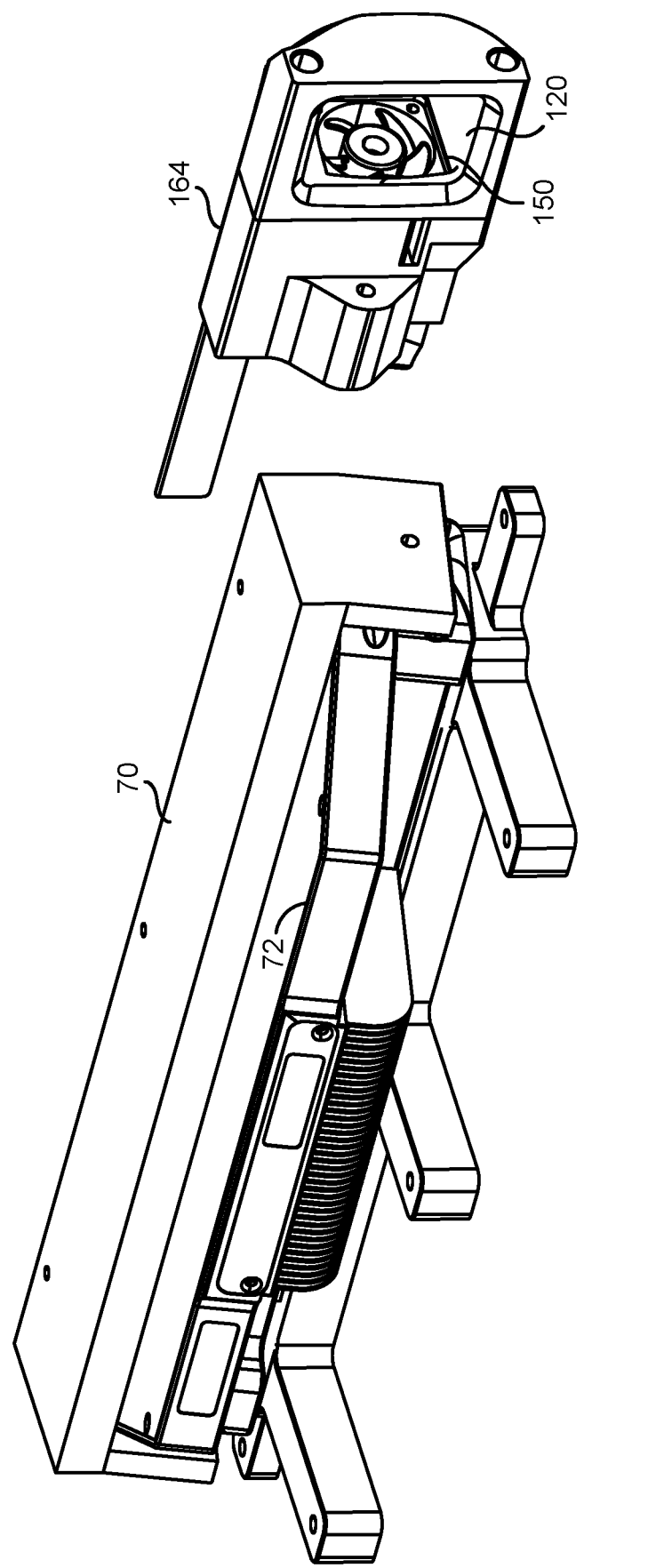
FIG. 8 is a more detailed diagram of a fan portion removed from the chamber.

Referring to FIG. 8, a more detailed diagram illustrating the fan 150 near the camera body 72 is shown. The fan 150 is shown included in a fan assembly 164. The fan assembly 164 may be configured to be secured to the camera body 72 and/or the camera mount rig 70. For example, the apparatus 100 may be removably attached to the camera body 72 and/or the camera mount rig 70. For example, one or more of the apparatus 100 may be attached as an after-market product.

Figure 9:
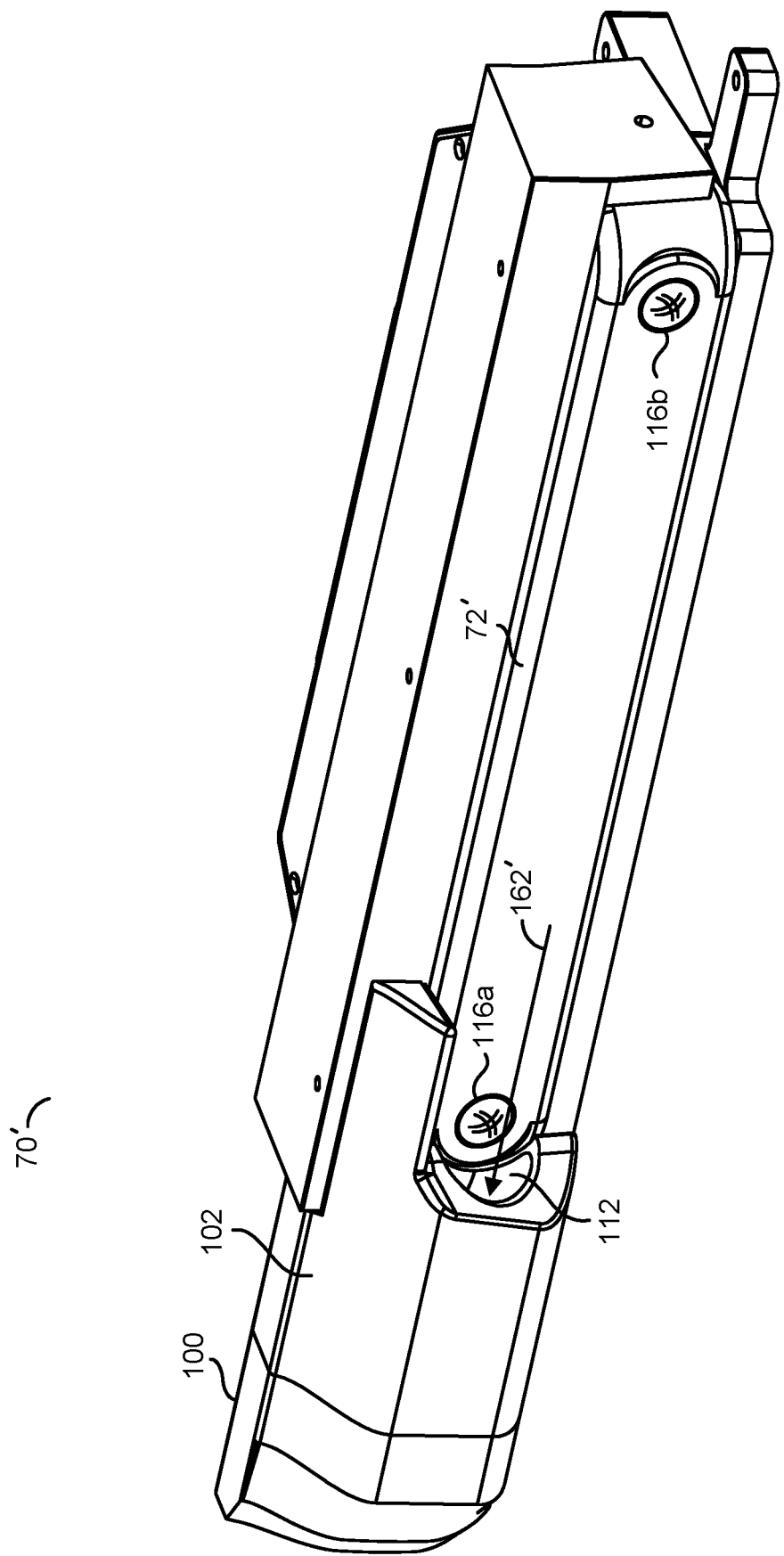
FIG. 9 is a diagram showing an alternate view.

Referring to FIG. 9, a diagram showing an alternate view of the apparatus 100 is shown. In the example shown, the mounting rig 70' may implement only one apparatus 100 (e.g., close to the lens 116a). For example, the apparatus 100' may be removed. The lens 116a and the lens 116b may each be cleared with a respective airflow.

In the example shown, the fan 150 may pull the airflow 162' across the lens 116a. For example, the airflow 162' may be pulled into the opening 112 and across the lens 116a and through the tunnel 104. In some embodiments, the fan 150 may be configured to alternate the direction of the airflow 162'. For example, the lens 116a may have a dome shape and pushing the airflow 162 from the opening 112 and across the lens 116a may clean a portion of the lens 116a closer to the opening 112 and pulling the airflow 162 across the lens 116a and into the opening 112 may clean a portion of the lens 116a farther from the opening 112. The fan 150 may be reversible to alternate the direction of the airflow.

Figure 10:
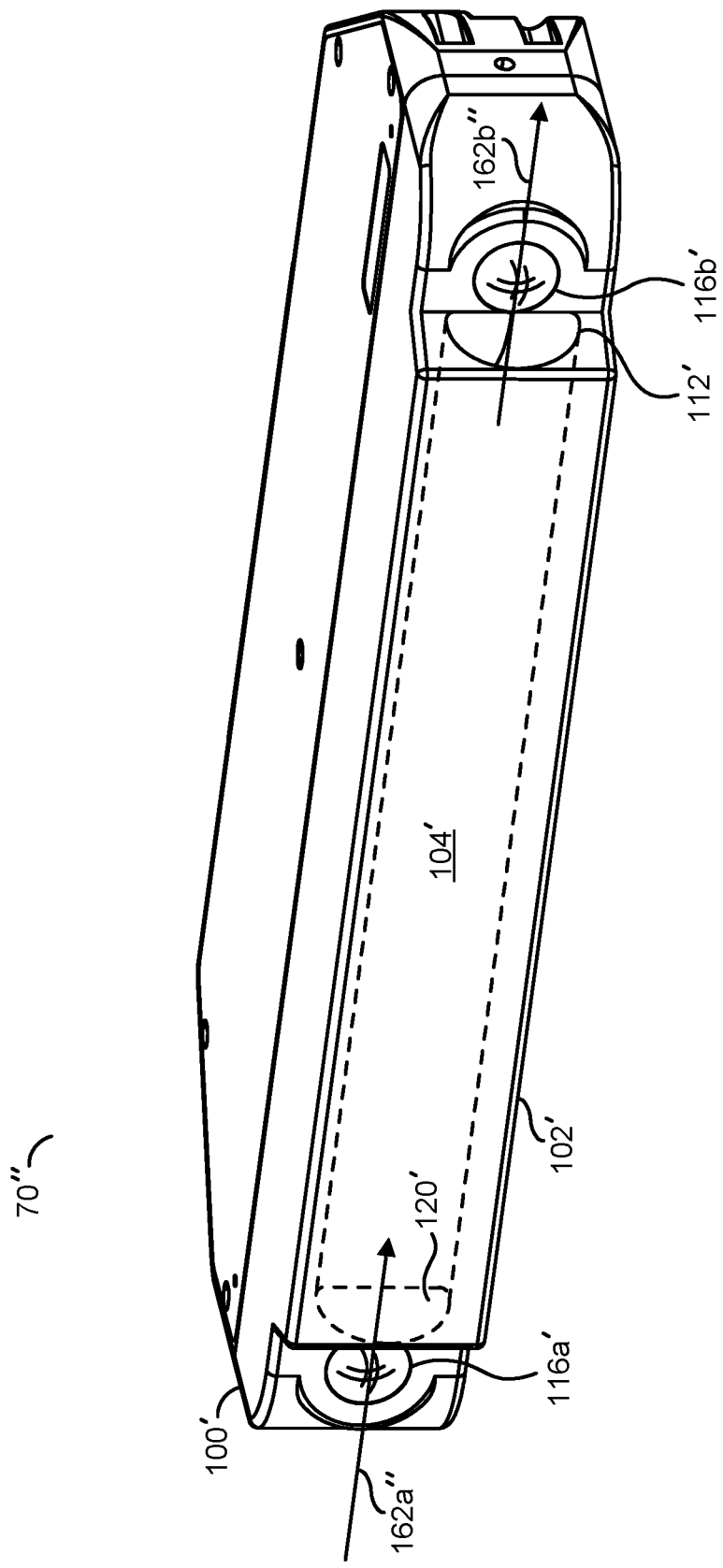
FIG. 10 is a diagram showing an alternate implementation.

Referring to FIG. 10, a diagram of an apparatus 100' illustrating a self-contained camera embodiment 70'' is shown. The apparatus 100' is shown having a lens 116a' and 116b'. The chamber 102' may be implemented in between the lenses 116a'-116b'. The first opening 112' may be located near the camera lens 116b'. The second opening 120' may be located near the camera lens 116a'. The tunnel 104' may extend between the opening 112' and the opening 120'.

The fan 150 (not shown) may be located in the tunnel 104'. The apparatus 100' may be configured to use the tunnel 104' to move air across both the lens 116a' and the lens 116b'. In the example shown, the fan 150 may pull the airflow 162a" across the lens 116a' and into the opening 120', through the tunnel 104' and out the opening 112' to push the airflow 162b" across the lens 116b'. The apparatus 100' may be configured to clean both the lens 116a' and the lens 116b' at the same time. In some embodiments, the airflow may be reversible. For example, the direction of the airflow 162a" may be changed from intake to exhaust and the direction of the airflow 162b" may be changed from exhaust to intake.

Figure 11:
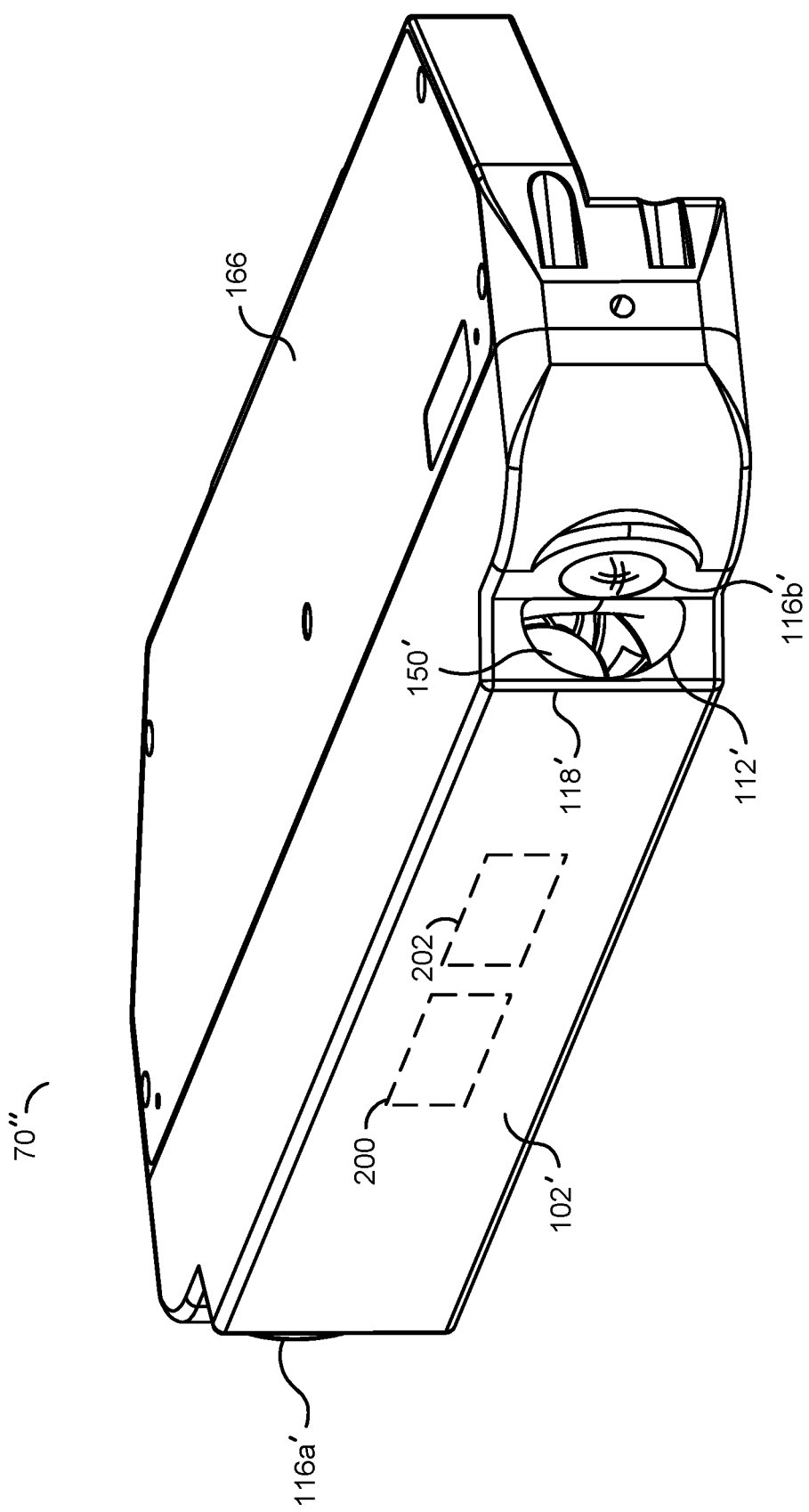
FIG. 11 is another diagram of the alternate implementation.

Referring to FIG. 11, an alternate view of the apparatus 100' is shown. The fan 150' is shown within the tunnel 104' (e.g., visible through the opening 112'). In some embodiments, multiple fans 150' may be implemented in the tunnel 104' (e.g., one fan near each of the lenses 116a'-116b'). The location of the fan 150' may be varied according to the design criteria of a particular implementation. A camera housing 166 is shown connected to the chamber 102'. Electronic components and/or other circuitry may be located within the camera housing 166.

The apparatus 100 may comprise a block (or circuit) 200 and/or a block (or circuit) 202. The circuit 200 may implement electronics. For example, the electronics 200 may comprise a controller. The electronics 200 may be configured to adjust a speed (e.g., modulate) and/or direction of the fan 150'. The circuit 202 may implement a heat source. The heat source 202 may be configured to adjust a temperature of the air within the tunnel 104'. The apparatus 100 may comprise other components (not shown). The number, type and/or arrangement of the components of the apparatus 100 may be varied according to the design criteria of a particular implementation.

Figure 12:
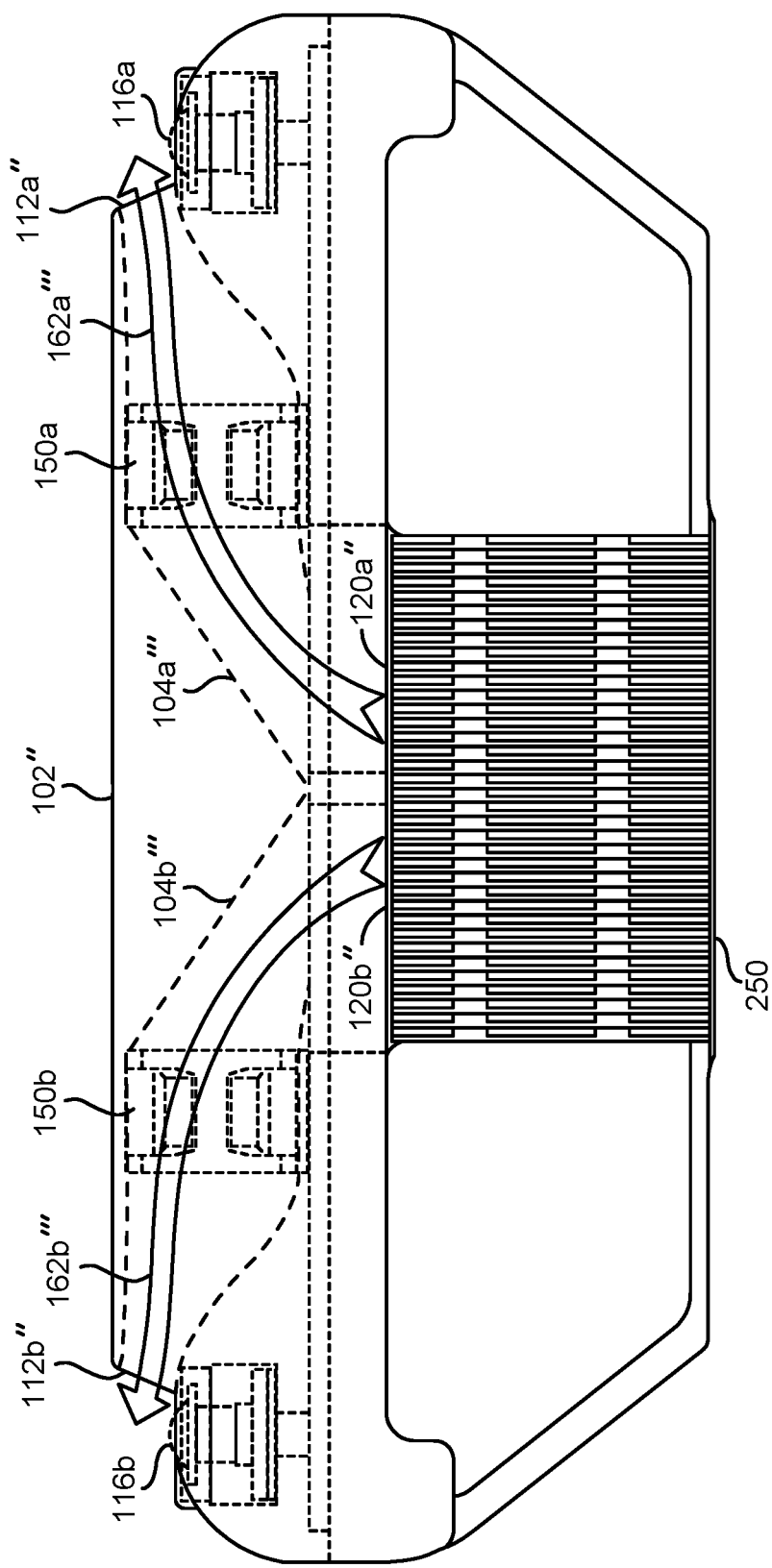
FIG. 12 is a diagram illustrating example airflow and a filter component.

Referring to FIG. 12, a diagram illustrating example airflow and a filter component is shown. A bottom view of the camera mount rig 70 and/or the camera body 72 is shown. A protected area 250 is shown. The protective area 250 may be an area where debris (e.g., dust, snow, rain, etc.) are not present and/or trapped. The protective area 250 may be an area that is protected from atmospheric conditions. In an example, the protected area 250 may be a filter. In another example, the protected area 250 may be an isolated container comprising a number of removable/replaceable filter cartridges. The filter 250 may be configured to provide a clean airflow in response to the fans 150a-150b.

In some embodiments, the tunnels 104a'"-104b'" may each branch off towards different directions within the chamber 102" from the filter 250 to a respective one of the lenses 116a-116b. Each of the tunnels 104a'"-104b'" may comprise a respective one of the fans 150a-150b. In the example shown, the fans 150a-150b may pull the airflow 162a'"-162b'" from the filter 250 and push the airflow 162a'"-162b'" across the respective camera lenses 116a-116b.

The openings 112a"-112b" are shown near the respective lenses 116a-116b. The openings 120a"-120b" are shown near the filter 250. For example, the tunnels 104a'"-104b'" may provide a path for the respective airflow 162a'"-162b'" from the respective intake openings 120a"-120b" to the respective exhaust openings 112a"-112b". The fans 150a-150b may pull clean air from the filter 250 through the intake openings 120a"-120b" and push the airflow 162a'"-162b'" through the exhaust openings 112a'"-112b'".

By pulling air from the filter 250, the fans 150a-150b may present a clean airflow 162a'"-162b'" across the lenses 116a-116b. The clean airflow 162a'"-162b'" may blow debris off the lenses 116a-116b without depositing new dirt and/or debris onto the lenses 116a-116b. The filter 250 may be replaceable. Replacing the filter 250 may ensure that the filter 250 is capable of providing the clean airflow 162a'"-162b'".

In some embodiments, the filter 250 may further comprise the heat source 202. For example, filter 250 may clean and the heat source 202 may heat the clean airflow 162a'"-162b'". Heating the airflow 162a'"-162b'" may be used to melt snow and/or ice from the lenses 116a-116b to aid in removal.

Figure 13:
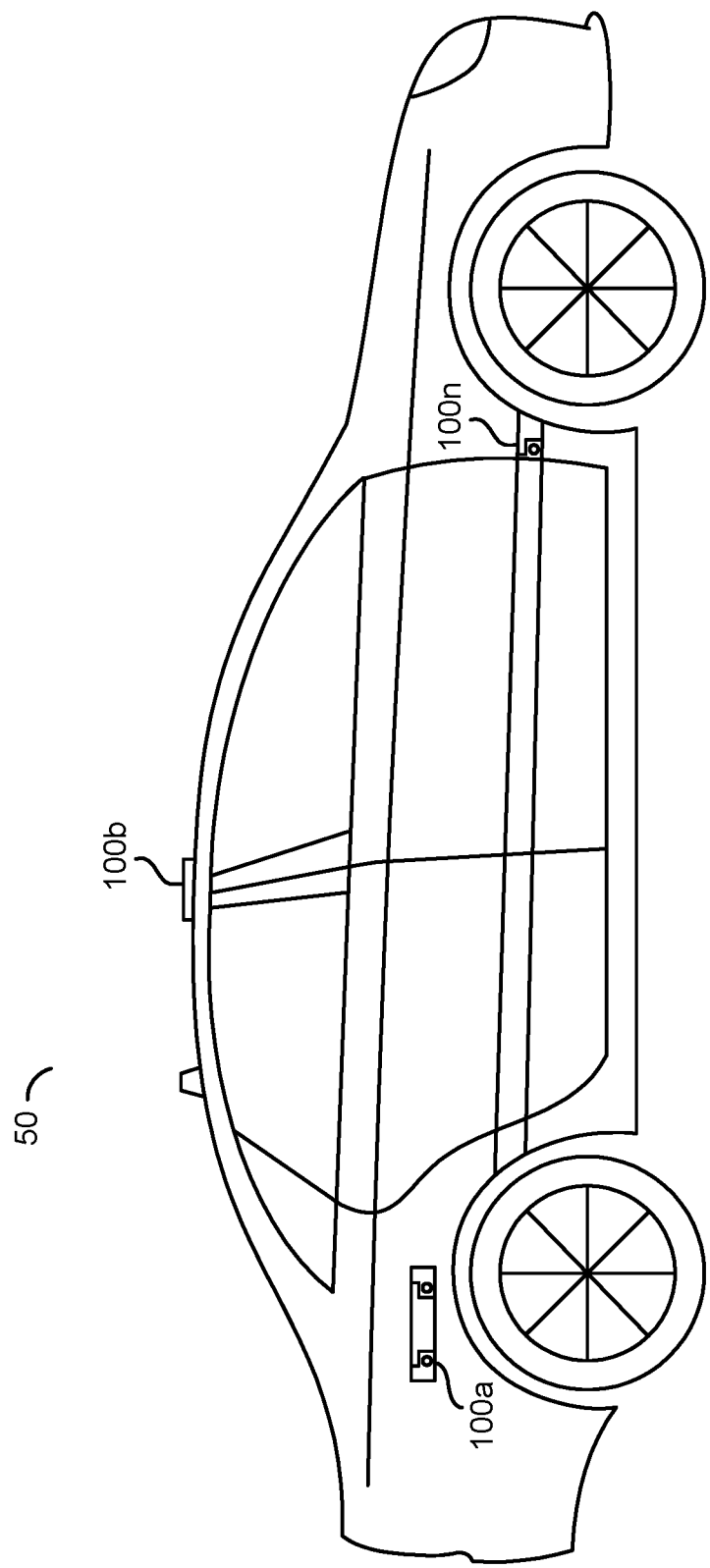
FIG. 13 is a diagram showing an installation in the context of a vehicle.

Referring to FIG. 13, a diagram showing an installation of a number of the apparatus 100a-100n in the context of a vehicle 50 is shown. The apparatus 100a is shown implemented in a rear side area of the vehicle 50. The apparatus 100b is shown implemented on a top area of the vehicle 50 (e.g., to clean a roof-mounted camera). The apparatus 100n is shown in a front side area of the vehicle 50. The particular location of the apparatus 100a-100n may be varied to meet the design criteria of a particular implementation. While three of the apparatus 100a-100n are shown, the particular number of the apparatus 100a-100n implemented on the vehicle 50 may be varied to meet the design criteria of a particular implementation.

The apparatus 100 may be used on cameras facing various directions around the vehicle 50. In a front facing implementation of the lens 116a (or 116b), the amount of airflow produced by the fan 150 may be reduced. The apparatus 100 may also be implemented in an environment where the lens 116 is further covered by a protective planar glass on which water drops could otherwise stick. The apparatus 100 may clear such protective glass.

The apparatus 100a-100n may be integrated as part of the body of the vehicle 50. For example, the apparatus 100a-100n may be built into body panels of the vehicle 50. For example, the protected area 250 may be isolated from the environment behind the body panels of the vehicle 250. In some embodiments, the tunnel 104 may be located behind the body panel and the opening 112 may be relatively flush against the body panel of the vehicle 50. For example, the opening 112 may be above the level of the body panel of the vehicle 50 enough to provide sufficient airflow but low enough to limit any negative aerodynamic effects.

Figure 14:
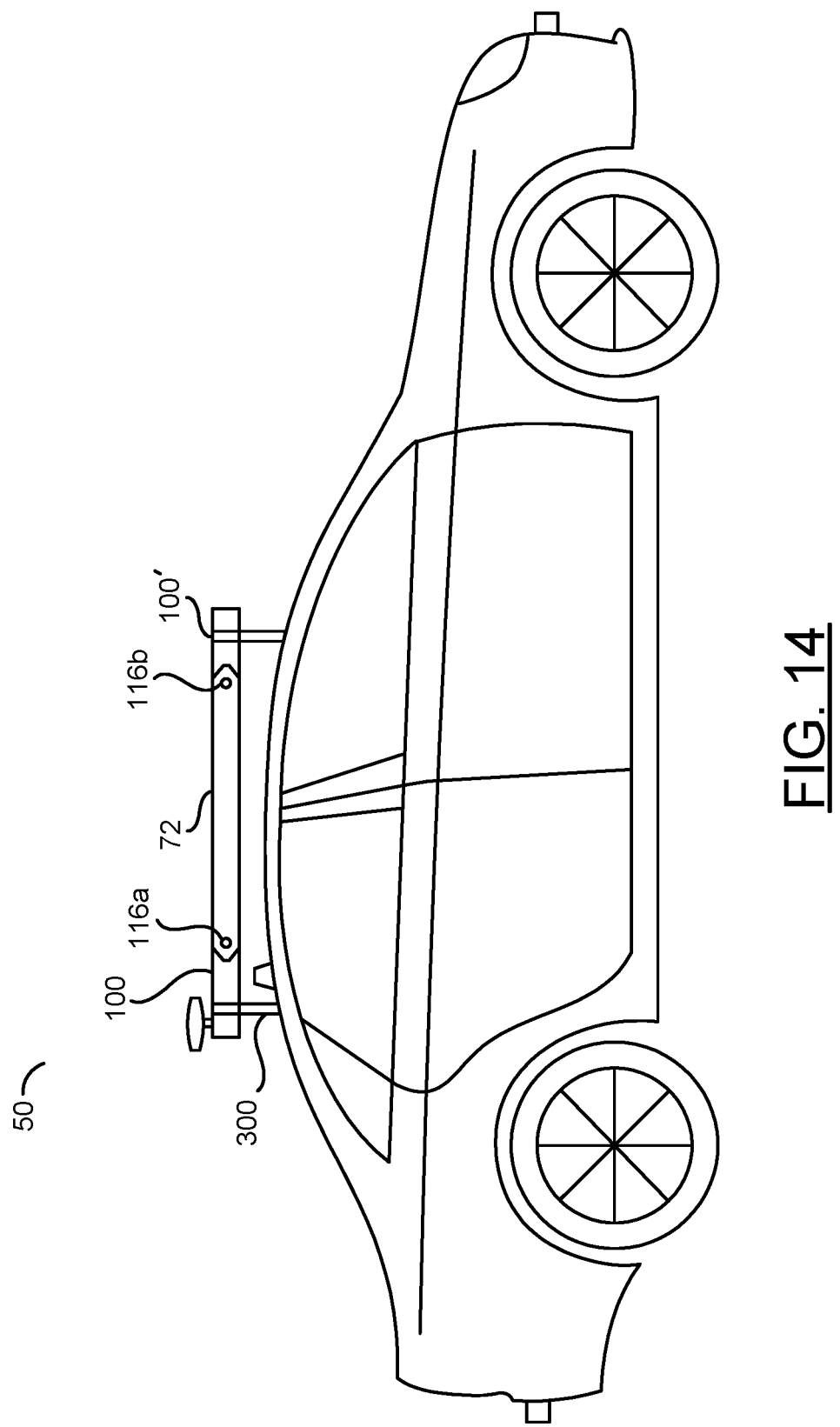
FIG. 14 is a diagram illustrating an installation in the context of a roof mount.

Referring to FIG. 14, a diagram illustrating an installation in the context of a roof mount is shown. The vehicle 50 is shown. A roof mount attachment 300 is shown attached to a roof of the vehicle 50. The apparatus 100 and the apparatus 100' are shown as part of the roof mount attachment 300.

The camera body 72 comprising the lenses 116a-116b is shown on a passenger side of the vehicle 50. In some embodiments, the roof mount attachment 300 may comprise multiple camera bodies each comprising multiple cameras and camera lenses. For example, the roof mount attachment 300 may comprise one camera body 72 in each direction (e.g., forward, rear, passenger side and driver side). Each of the lenses 116 may have the apparatus 100 to implement cleaning.

Figure 15:
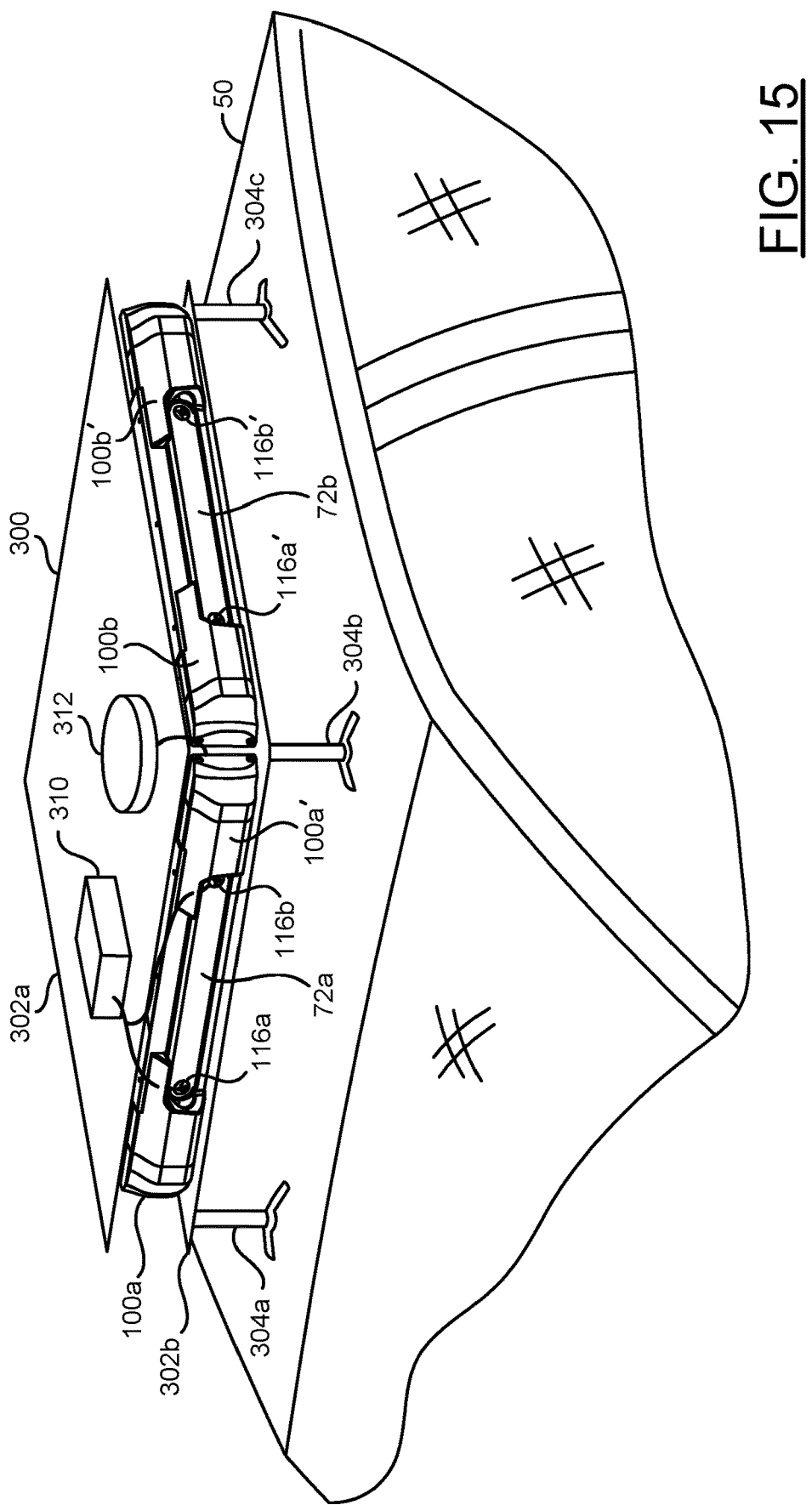
FIG. 15 is a diagram illustrating an alternate view of the roof mount embodiment.

Referring to FIG. 15, a diagram illustrating an alternate view of the roof mount embodiment is shown. The roof mount 300 is shown attached to the roof of the vehicle 50. The roof mount 300 may comprise platforms 302a-302b. The camera bodies 72a-72b are shown mounted between the platforms 302a-302b. For example, the camera mount rigs 70a-70b may be used to secure the camera bodies 72a-72b to the platforms 302a-302b. Legs 304a-304c are shown. A leg 304d (not shown) may be obscured. The legs 304a-304d may provide support and/or an attachment to the roof of the vehicle 50 for the roof mount 300.

The roof mount 300 may be implemented to enable testing and development. For example, the cameras implemented by the camera bodies 72a-72b may be used for computer vision in driving scenarios. The roof mount 300 may provide an attachment that enables securely mounting cameras to a vehicle (e.g., without building cameras into a car body). The roof mount 300 may be attached to various types, makes and/or models of vehicles to reduce a cost of testing computer vision in driving scenarios (e.g., cameras may be added to a vehicle as an after-market attachment).

In the view shown, the camera bodies 72a-72b are visible. Similarly, the roof mount 300 may support additional camera bodies (e.g., 4 camera bodies aimed in different directions). In the example shown, the camera body 72a may be directed towards a front view from the vehicle 50 and the camera body 72b may be directed towards a driver side view from the vehicle 50. Similarly, a camera body 72c (not shown) may be mounted to the roof mount 300 to provide a passenger side view from the vehicle 50 and/or a camera body 72d (not shown) may be mounted to the roof mount 300 to provide a rear view from the vehicle 50.

In some embodiments, more than four camera bodies may be secured to the roof mount 300. For example, a second row of cameras may be secured to the roof mount (e.g., attached under the platform 302b. In some embodiments, the camera bodies may be mounted at different angles. For example, eight camera bodies may be implemented to form an octagonal shape. The number and/or arrangement of the cameras may be varied according to the design criteria of a particular implementation.

A block (or circuit) 310 and/or a block (or circuit) 312 are shown on the platform 302a. The circuits 310-312 may provide additional electronics. In one example, the circuits 310-312 may provide storage and/or processing for computer vision performed on video data captured by the cameras 72a-72n. In another example, the circuits 310-312 may be used to store and/or process data acquired from the cameras 72a-72n to enable acquiring and/or updating street views for mapping and/or navigation services. In yet another example, the circuits 310-312 may be used to store and/or process data acquired from the cameras 72a-72n to acquire high resolution maps used to aid autonomous driving. In still another example, the circuits 310-312 may be used to store and/or process data from the cameras 72a-72n used for filming movies and/or creating time lapse videos. In some embodiments, the circuit 310 may implement a compressor and the circuit 312 may implement a GPS antenna. For example, the GPS antenna may be used by the computer vision processing on video data captured by the cameras 72a-72n. The number, type, functionality and/or arrangement of additional electronics on the roof mount 300 may be varied according to the design criteria of a particular implementation.

In some embodiments, the apparatus 100 may be implemented to clean other types of sensors. For example, instead of cleaning the lenses 116, the apparatus 100 may clean other data acquisition devices. In one example, the apparatus 100 may clean debris from a LIDAR sensor. In another example, the apparatus 100 may clean debris from radar and/or infrared sensors. In still another example, the apparatus 100 may clean debris from headlights and/or vehicle flood lights. The types of sensors and/or objects that the apparatus 100 may be configured to clean may be varied according to the design criteria of a particular implementation.

While the apparatus 100 has been described in the context of removing dust and water droplets for the lens 116, the apparatus may also be useful in a winter environment. In an example winter environment, when a truck passes, a big splash of snowy slush often hits the windshield of the vehicle 50. Such slush may also cover the lens 116, particularly in side facing cameras. The controller 200 may be used to increase the airflow and/or switch on the heat source 202 shortly after such an event happens. The heat may melt snow, ice and/or slush on the lens 116. The increased airflow may speed the clearing of the lens 116. In an example without such control, fan 150 may run at full speed to maximize airflow.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a fan configured to generate an airflow; and
a chamber (i) comprising a tunnel with a first opening and a second opening and (ii) configured to move said airflow through said tunnel and across a camera lens, wherein (a) said first opening is located close enough to clean said camera lens by directing said airflow across said camera lens, (b) said first opening is on an edge of said chamber that extends said tunnel in a direction of an optical axis of said camera lens, (c) said edge has an angle that corresponds to a field of view of said camera lens such that said field of view is not obstructed and (d) a speed of said fan is modulated.

2. The apparatus according to claim 1, wherein said fan pushes said airflow across said camera lens.

3. The apparatus according to claim 2, wherein said fan pulls said airflow into said tunnel from a protected area.

4. The apparatus according to claim 3, wherein said protected area is a filter.

5. The apparatus according to claim 1, wherein said fan pulls said airflow across said camera lens and into said tunnel.

6. The apparatus according to claim 1, wherein said apparatus is integrated into a body of a camera.

7. The apparatus according to claim 1, wherein said apparatus is integrated into a body of a vehicle.

8. The apparatus according to claim 1, wherein said apparatus is attached to a vehicle as a roof mount.

9. The apparatus according to claim 1, wherein said angle is less than 90 degrees from said optical axis.

10. The apparatus according to claim 1, further comprising a heat source configured to warm said airflow through said tunnel, wherein said airflow is warmed to (i) remove snow and (ii) improve cleaning.

11. The apparatus according to claim 1, wherein said chamber is mounted to a camera rig.

12. The apparatus according to claim 1, wherein said second opening is used to pull said airflow across a second camera lens and said first opening is used to push said airflow across a first camera lens.

13. The apparatus according to claim 1, wherein said chamber comprises two tunnels each configured to push respective airflows across respective camera lenses.

14. The apparatus according to claim 13, wherein said airflows are each pulled from a protected area.

15. An apparatus comprising:
a fan configured to generate an airflow; and
a chamber (i) comprising a tunnel with a first opening and a second opening and (ii) configured to move said airflow through said tunnel and across a camera lens, wherein (a) said first opening is located close enough to clean said camera lens by directing said airflow across said camera lens, (b) said first opening is on an edge of said chamber that extends said tunnel in a direction of an optical axis of said camera lens, (c) said edge has an angle that corresponds to a field of view of said camera lens such that said field of view is not obstructed and (d) said fan pulls said airflow across said camera lens and into said tunnel.

16. An apparatus comprising:
a fan configured to generate an airflow; and
a chamber (i) comprising a tunnel with a first opening and a second opening and (ii) configured to move said airflow through said tunnel and across a camera lens, wherein (a) said first opening is located close enough to clean said camera lens by directing said airflow across said camera lens, (b) said first opening is on an edge of said chamber that extends said tunnel in a direction of an optical axis of said camera lens, (c) said edge has an angle that corresponds to a field of view of said camera lens such that said field of view is not obstructed and (d) said angle is less than 90 degrees from said optical axis.

17. An apparatus comprising:
a fan configured to generate an airflow;
a heat source configured to warm said airflow through a tunnel; and
a chamber (i) comprising said tunnel with a first opening and a second opening and (ii) configured to move said airflow through said tunnel and across a camera lens, wherein (a) said first opening is located close enough to clean said camera lens by directing said airflow across said camera lens, (b) said first opening is on an edge of said chamber that extends said tunnel in a direction of an optical axis of said camera lens, (c) said edge has an angle that corresponds to a field of view of said camera lens such that said field of view is not obstructed and (d) said airflow is warmed to (i) remove snow and (ii) improve cleaning.

18. An apparatus comprising:
a fan configured to generate an airflow; and
a chamber (i) comprising a tunnel with a first opening and a second opening and (ii) configured to move said airflow through said tunnel and across a camera lens, wherein (a) said first opening is located close enough to clean said camera lens by directing said airflow across said camera lens, (b) said first opening is on an edge of said chamber that extends said tunnel in a direction of an optical axis of said camera lens, (c) said edge has an angle that corresponds to a field of view of said camera lens such that said field of view is not obstructed and (d) said second opening is used to pull said airflow across a second camera lens and said first opening is used to push said airflow across a first camera lens.

19. An apparatus comprising:
a fan configured to generate an airflow; and
a chamber (i) comprising a tunnel with a first opening and a second opening and (ii) configured to move said airflow through said tunnel and across a camera lens, wherein (a) said first opening is located close enough to clean said camera lens by directing said airflow across said camera lens, (b) said first opening is on an edge of said chamber that extends said tunnel in a direction of an optical axis of said camera lens, (c) said edge has an angle that corresponds to a field of view of said camera lens such that said field of view is not obstructed and (d) said chamber comprises two tunnels each configured to push respective airflows across respective camera lenses.

* * * * *